US012643795B2

(12) United States Patent
Min et al.

(10) Patent No.: US 12,643,795 B2
(45) Date of Patent: Jun. 2, 2026

(54) METHOD AND APPARATUS FOR MANUFACTURING SILICA AEROGEL BLANKET

(71) Applicant: LG CHEM, LTD., Seoul (KR)

(72) Inventors: Kyung Seok Min, Daejeon (KR); Se Won Baek, Daejeon (KR); Sang Woo Park, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 400 days.

(21) Appl. No.: 18/018,336

(22) PCT Filed: Aug. 5, 2021

(86) PCT No.: PCT/KR2021/010332
§ 371 (c)(1),
(2) Date: Jan. 27, 2023

(87) PCT Pub. No.: WO2022/031074
PCT Pub. Date: Feb. 10, 2022

(65) Prior Publication Data
US 2023/0294998 A1 Sep. 21, 2023

(30) Foreign Application Priority Data

Aug. 7, 2020 (KR) ........................ 10-2020-0099296

(51) Int. Cl.
*C01B 33/158* (2006.01)
*B01D 53/00* (2006.01)
(52) U.S. Cl.
CPC ........ *C01B 33/1585* (2013.01); *B01D 53/002* (2013.01)

(58) Field of Classification Search
CPC ... C01B 33/1585; B01D 53/002; Y02P 20/54; Y02P 20/151; B01J 13/0091; B01J 3/008; F25J 1/0027; C01P 2006/32
See application file for complete search history.

(56) References Cited

U.S. PATENT DOCUMENTS

2007/0062800 A1   3/2007   Kanda et al.
2012/0240426 A1   9/2012   Hayashi et al.
(Continued)

FOREIGN PATENT DOCUMENTS

CN   101475889 A   7/2009
CN   102491326 A   *   6/2012
(Continued)

OTHER PUBLICATIONS

Oh et al. WO2020130353A1 English Machine Translation (Year: 2020).*
(Continued)

*Primary Examiner* — Sally A Merkling
*Assistant Examiner* — Jordan W Taylor
(74) *Attorney, Agent, or Firm* — Bryan Cave Leighton Paisner LLP

(57) ABSTRACT

Provided is a method of manufacturing a silica aerogel blanket, and an apparatus for manufacturing a silica aerogel blanket used in the method. The method includes: (1) drying a silica hydrogel through a supercritical drying process using a supercritical extractor; (2) separating an extract discharged from the supercritical extractor into a gaseous phase including $CO_2$ and a liquid phase including a solvent through a separator to discharge the gaseous phase and the liquid phase; and (3) condensing the gaseous phase including $CO_2$ discharged from the separator in a condenser, wherein the separation in the separator is performed under the condition of a pressure of 60 bar to 90 bar, and the gaseous phase (Continued)

including $CO_2$ discharged from the separator is condensed in the condenser so that the gaseous phase has a temperature of 10° C. or higher and a pressure of 60 bar to 90 bar.

5 Claims, 3 Drawing Sheets

(56) References Cited

U.S. PATENT DOCUMENTS

| | | | |
|---|---|---|---|
| 2013/0061492 A1 | 3/2013 | Okuchi et al. | |
| 2016/0264427 A1* | 9/2016 | Oh | C01B 33/16 |
| 2018/0370809 A1* | 12/2018 | Lee | B01D 5/0045 |
| 2019/0225498 A1 | 7/2019 | Ruiz et al. | |
| 2019/0276322 A1 | 9/2019 | Kim et al. | |
| 2020/0094164 A1 | 3/2020 | Jang et al. | |
| 2020/0331766 A1 | 10/2020 | Oh et al. | |
| 2021/0261420 A1 | 8/2021 | Oh et al. | |
| 2024/0359994 A1 | 10/2024 | Oh et al. | |

FOREIGN PATENT DOCUMENTS

| | | | | |
|---|---|---|---|---|
| CN | 108636304 A * | 10/2018 | | B01J 13/0095 |
| CN | 109415214 | 3/2019 | | |
| CN | 111111572 | 5/2020 | | |
| CN | 111212813 | 5/2020 | | |
| EP | 3453676 A1 | 3/2019 | | |
| EP | 3586936 A1 | 1/2020 | | |
| JP | 2005-281016 | 10/2005 | | |
| JP | 2007083122 A | 4/2007 | | |
| JP | 2007-330964 | 12/2007 | | |
| JP | 2010024069 A | 2/2010 | | |
| JP | 2010-240629 | 10/2010 | | |
| JP | 2011-218352 | 11/2011 | | |
| JP | 2012204656 A | 10/2012 | | |
| JP | 2013062417 A | 4/2013 | | |
| JP | 2019-524611 | 9/2019 | | |
| JP | 2020192511 A | 12/2020 | | |
| KR | 10-2002-0027749 | 4/2002 | | |
| KR | 10-0457096 | 11/2004 | | |
| KR | 101454233 | 10/2014 | | |
| KR | 10-2019-0029436 | 3/2019 | | |
| KR | 101958995 | 3/2019 | | |
| KR | 10-2019-0056818 | 5/2019 | | |
| KR | 10-2020-0077284 | 6/2020 | | |
| WO | WO-2015173934 A1 * | 11/2015 | | B01D 36/02 |
| WO | WO-2019093868 A2 * | 5/2019 | | B01J 13/00 |
| WO | WO-2020053349 A1 * | 3/2020 | | F26B 21/40 |
| WO | WO-2020130353 A1 * | 6/2020 | | B01J 13/0091 |

OTHER PUBLICATIONS

Zhang et al. (CN102491326A English Machine Translation) (Year: 2012).*

Kim et al. (WO2019093868A2 English Machine Translation) (Year: 2019).*

Lazar et al. Gels 2016, 2, 26 (Year: 2016).*

Wang et al. CN108636304A English Machine Translation (Year: 2018).*

Saito et al. WO2015173934A1 English Machine Translation (Year: 2015).*

Movahhed et al. WO2020053349A1 English Machine Translation (Year: 2020).*

Database WPI Week 2020058 Thomson Scientific, London, GB; AN 2020-57204X, XP002812051 (2020).

Database WPI Week 200270 Thomson Scientific, London, GB; AN 2002-652351, XP002812052 (2002).

* cited by examiner

METHOD AND APPARATUS FOR MANUFACTURING SILICA AEROGEL BLANKET

CROSS-REFERENCE TO RELATED APPLICATIONS

This application is a National Stage Application of International Application No. PCT/KR2021/010332 filed on Aug. 5, 2021, which claims priority to and the benefit of Korean Patent Application No. 10-2020-0099296, filed Aug. 7, 2020, the disclosure of which is incorporated herein by reference in its entirety.

TECHNICAL FIELD

The present invention relates to a method and an apparatus for manufacturing a silica aerogel blanket, and more particularly, to a method for efficiently recovering $CO_2$ used in a supercritical drying step of a process of manufacturing a silica aerogel blanket, and an apparatus used in the method.

BACKGROUND

Aerogels are highly porous materials that are composed of nanoparticles, and have attracted attention for use as high-efficiency insulating materials, soundproof materials, and the like because they have high porosity and a high specific surface area and low thermal conductivity. Because such aerogels have very low mechanical strength due to their porous structure, aerogel composites, in which an aerogel is impregnated into fibrous blankets formed of existing insulating fibers (such as organic or inorganic fibers) so that the aerogel is bound to the fibrous blankets, have been developed. As one example, a silica aerogel-containing blanket using a silica aerogel is manufactured through a silica sol preparation step, a gelation step, an aging step, a surface modification step, and a drying step.

In the related art, a solvent such as ethanol included in the silica aerogel is extracted in the supercritical drying step using high-temperature/high-pressure supercritical $CO_2$. In this case, a separator is used to separate used $CO_2$ and the extracted solvent such as ethanol. The recovered solvent such as ethanol in a liquid phase is subjected to a purification process, and then reused in the silica sol preparation step and the gelation step. Meanwhile, $CO_2$ used to extract the solvent is separated through the separator, condensed, recompressed, and then used in the supercritical drying step. In this case, a large amount of energy is consumed during the recompression process.

Therefore, the present invention is designed to provide a method of reducing the overall consumption of energy by making such a supercritical drying process more efficient, and an apparatus used in the method.

PRIOR ART DOCUMENT

Patent Document

Patent Document 1: KR 10-2019-0056818 A

BRIEF DESCRIPTION

Technical Problem

Therefore, it is an object of the present invention to provide a method of manufacturing a silica aerogel blanket capable of making an overall supercritical drying process more efficient to reduce energy consumption by adjusting the separation conditions of a supercritical extract, which is used in a supercritical drying step during a process of manufacturing a silica aerogel blanket, in a separator and adjusting the condensing conditions used to condense recovered $CO_2$.

It is another object of the present invention to provide an apparatus for manufacturing a silica aerogel blanket capable of being used in the method of manufacturing a silica aerogel blanket.

Technical Solution

To achieve the above object, according to one aspect of the present invention, there is provided a method of manufacturing a silica aerogel blanket, which includes: (1) drying a silica hydrogel through a supercritical drying process using a supercritical extractor; (2) separating an extract discharged from the supercritical extractor into a gaseous phase including $CO_2$ and a liquid phase including a solvent through the separator to discharge the gaseous phase and the liquid phase; and (3) condensing the gaseous phase including $CO_2$ discharged from the separator in a condenser, wherein the separation in the separator is performed under the condition of a pressure of 60 bar to 90 bar, and the gaseous phase including $CO_2$ discharged from the separator is condensed in the condenser so that the gaseous phase has a temperature of 10° C. or higher and a pressure of 60 bar to 90 bar.

To achieve the above object, according to another aspect of the present invention, there is provided an apparatus for manufacturing a silica aerogel blanket, which includes a supercritical extractor into which a silica hydrogel is introduced and $CO_2$ is injected; a separator connected to the supercritical extractor through a pipe and configured to separate the extract discharged from the supercritical extractor into a gaseous phase including $CO_2$ and a liquid phase including a solvent to discharge the gaseous phase and the liquid phase; and a condenser connected to the separator through a pipe and configured to condense the gaseous phase including $CO_2$ discharged from the separator, wherein the separator is operated under the condition of a pressure of 60 bar to 90 bar, and the condenser condenses the gaseous phase including $CO_2$ discharged from the separator so that the gaseous phase has a temperature of 10° C. or higher and a pressure of 60 bar to 90 bar.

Advantageous Effects

A method of manufacturing a silica aerogel blanket according to the present invention can make an overall supercritical drying process more efficient to reduce energy consumption by adjusting pressure conditions for a process of separating the extract discharged from a supercritical extractor in a supercritical drying process and condensing a gaseous phase including $CO_2$ discharged from the separator so that the gaseous phase has a certain temperature or higher and a certain pressure range, and also can effectively perform the method of manufacturing a silica aerogel blanket according to the present invention using an apparatus for manufacturing a silica aerogel blanket according to the present invention.

BRIEF DESCRIPTION OF THE DRAWINGS

Since the drawings attached to this specification are illustrative of preferred examples of the present invention, and serve to enable technical concepts of the present invention to be further understood together with the detailed description of the invention given below, the present invention should not be interpreted as being limited only to the details described in such drawings.

DETAILED DESCRIPTION

Figure 1:
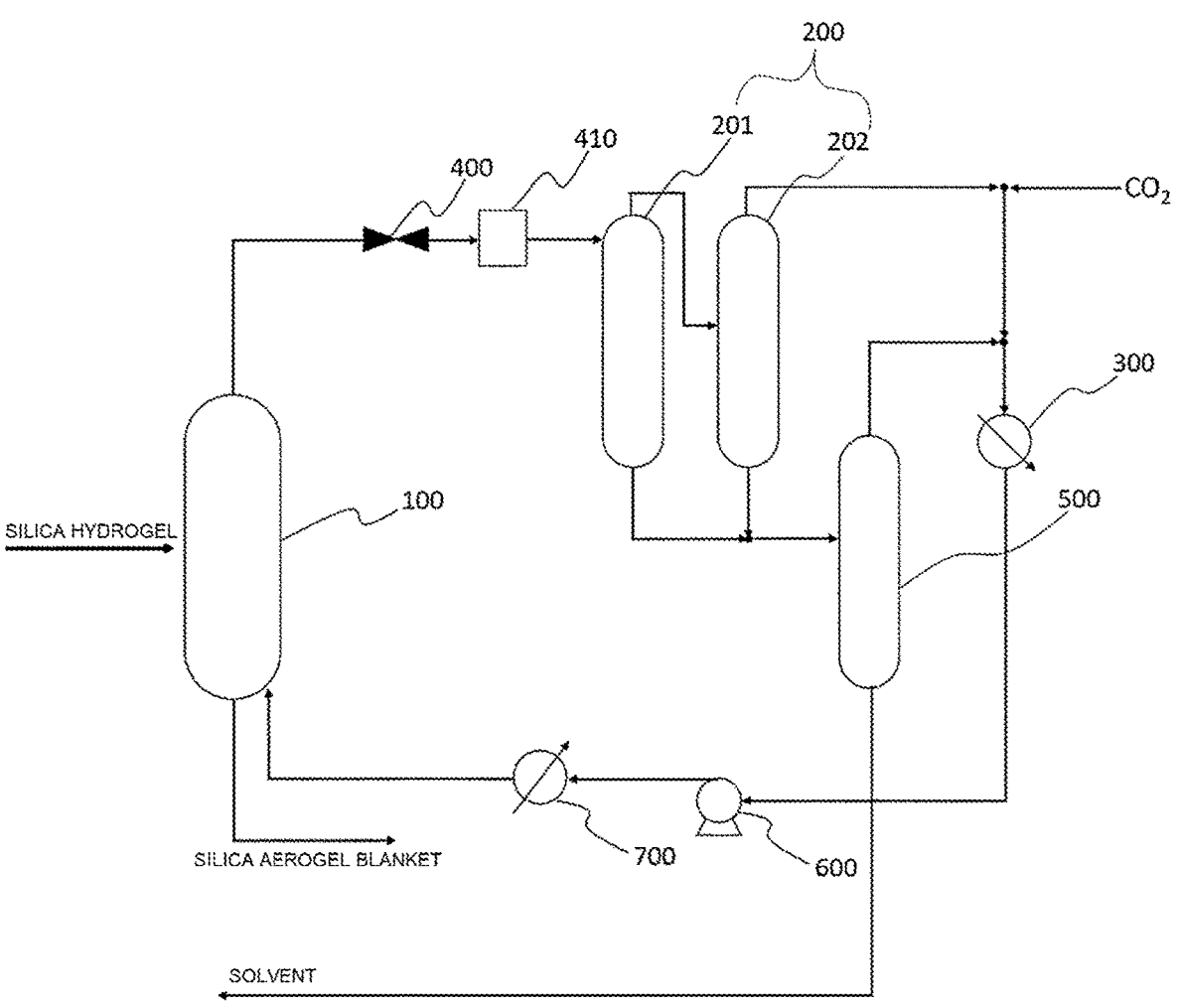
FIG. 1 schematically shows an apparatus for manufacturing a silica aerogel blanket according to one embodiment of the present invention.

Hereinafter, the present invention will be described in further detail in order to aid in understanding the present invention. In this case, the terms and words used in this specification and the appended claims are not intended to be construed as having common and dictionary meanings but are construed as having meanings and concepts corresponding to the technical spirit of the present invention in view of the principle that the present inventors can properly define the concepts of the terms and words in order to describe his/her invention with the best way.

A silica aerogel widely used as an insulating material in construction or industrial sites has a drawback in that the silica aerogel absorbs water in the air to gradually increase its thermal conductivity due to the hydrophilicity of a silanol group (Si—OH) when a surface of the silica aerogel is not made hydrophobic. Also, the silica aerogel has a problem in that it is difficult to expect a spring back phenomenon because the collapse of pores is accelerated during a drying process, which makes it difficult to manufacture super-insulating products having micropores.

Therefore, it is necessary to hydrophobically modify a surface of the silica aerogel in order to suppress the absorption of moisture in the air to maintain low thermal conductivity. In general, the silica aerogel is manufactured through a silica sol preparation step, a gelation step, an aging step, a surface modification step, and a drying step. In this case, the order of the surface modification step can be changed, when necessary.

In the supercritical drying step, a solvent such as ethanol contained in the silica aerogel is extracted using high-temperature/high-pressure supercritical $CO_2$, and a separator is used to separate the extracted solvent such as ethanol and the used $CO_2$.

The recovered solvent such as ethanol in a liquid phase is subjected to a purification process, and then reused in the silica sol preparation step and the gelation step. In this case, $CO_2$ used to extract the solvent is separated through the separator, condensed, recompressed, and then used in the supercritical drying step.

The supercritical drying step is performed under a high-pressure condition, compared to a separation step of separating the extracted solvent such as ethanol and the used $CO_2$ and a condensation step of condensing the recovered $CO_2$. For this purpose, the recovered $CO_2$ should undergo a recompression process for compressing $CO_2$ to a high pressure in order to match the pressure so that recovered $CO_2$ can be reused in the supercritical drying step. In this case, a large amount of energy is consumed in the recompression process.

The method of manufacturing a silica aerogel blanket according to the present invention includes: (1) drying a silica hydrogel through a supercritical drying process using a supercritical extractor; (2) separating an extract discharged from the supercritical extractor into a gaseous phase including $CO_2$ and a liquid phase including a solvent through a separator to discharge the gaseous phase and the liquid phase; and (3) condensing the gaseous phase including $CO_2$ discharged from the separator in a condenser, wherein the separation in the separator is performed under the condition of a pressure of 60 bar to 90 bar, and the gaseous phase including $CO_2$ discharged from the separator is condensed in the condenser so that the gaseous phase has a temperature of 10° C. or higher and a pressure of 60 bar to 90 bar.

For the pressure condition (e.g., a pressure of 60 bar to 90 bar) in the separator and the temperature and pressure conditions (e.g., a temperature of 10° C. or higher and a pressure of 60 bar to 90 bar) in the condenser, the pressure, or the temperature and pressure is/are higher than those in both of a separation step using a conventional separator and a condensation step using a condenser. Therefore, the consumption of energy required in the condensation process and the consumption of energy required in a subsequent recompression process can be reduced. Also, because the temperature in the condensation step is a condition used to further apply an absorption chiller, further energy reduction can be promoted using the surrounding waste heat of the process.

According to one embodiment of the present invention, a pressure of $CO_2$ injected into the supercritical extractor can be in a range of 100 bar to 190 bar, specifically in a range of 120 bar to 180 bar, and more specifically in a range of 150 bar to 170 bar. When $CO_2$ is injected at a pressure less than the above range, $CO_2$ can form a gaseous phase/liquid phase interface, which makes it impossible to uniformly diffuse $CO_2$ into the blanket. On the other hand, when $CO_2$ is injected at a pressure greater than the above range, an increase in energy consumption can be caused, and process costs are excessive. In particular, when $CO_2$ is injected at a pressure less than the above range, it can be difficult to cool an extract to an appropriate temperature range when the extract is decompressed later.

Also, the temperature in the supercritical drying process can be in a range of 40° C. to 110° C., specifically in a range of 50° C. to 100° C., and more specifically in a range of 70° C. to 90° C. When the supercritical drying process is performed at a temperature lower than the above range, $CO_2$ can be poorly diffused into aerogel pores, which results in deteriorated drying efficiency and a delayed drying time.

In the supercritical drying step, the solvent such as ethanol contained in the silica hydrogel is extracted using high-temperature/high-pressure supercritical $CO_2$ to dry the silica hydrogel.

After the supercritical drying step, the extract used for extraction in the supercritical extractor is discharged, and the discharged extract is separated into a gaseous phase including $CO_2$ and a liquid phase including a solvent through the separator, and then separated and discharged from the separator.

Throughout the specification of the present invention, the extract discharged from the supercritical extractor refers to a waste liquid generated after the supercritical drying process. In this case, the waste liquid can include water, an organic solvent, and $CO_2$, and can further include a residue derived from a catalyst used in a process of manufacturing a silica aerogel, ammonium ions ($NH_4^+$) derived from a surface modifying agent used in a process of making a surface of the silica aerogel hydrophobic, and the like. The organic solvent can include one or more selected from the group consisting of methanol, ethanol, hexane, pentane, and isopropanol. More specifically, the organic solvent can be ethanol.

The separator is a device for separating $CO_2$, ethanol, and the like from the extract discharged from supercritical extractor. For example, the separator can be a gas/liquid separator including a flash separator, a multi-stage distiller, or the like. According to one embodiment of the present invention, when a plurality of flash separators are connected and used as the separator or the multi-stage distiller is used, the plurality of flash separators and a distiller constituting the multi-stage distiller can be operated under the same or different temperature and pressure conditions.

For example, the separator can be a device that has an upper portion through which a gaseous phase including $CO_2$ is separated and discharged and a lower portion through which a liquid phase including a solvent is separated and discharged. The gaseous phase including $CO_2$ can be, specifically, the separated $CO_2$ in a gaseous phase, and the liquid phase including a solvent can further include other components such as water, ammonium ions ($NH_4^+$), and the like in addition to the organic solvent such as ethanol, and the like.

The gaseous phase including $CO_2$ separated and discharged from the upper portion of the separator can be condensed in the condenser. In this case, the gaseous phase can be condensed into a liquid phase in the condenser, and recycled into the supercritical extractor, and the solvent and the like discharged in the liquid phase can be reused as a raw material in a gelation process after the solvent has undergone a purification process, and the like. Also, an additional gas/liquid separation process can be performed before the purification process.

The separation in the separator can be performed under the condition of a pressure of 60 bar to 90 bar, specifically a pressure of 60 bar to 80 bar, and more specifically a pressure of 60 bar to 70 bar. Also, the separation in the separator can be performed under the condition of a temperature of 20° C. to 60° C., specifically a temperature of 30° C. to 50° C., and more specifically a temperature of 35° C. to 45° C. The pressure condition in the separator can be the condition of a higher pressure than the pressure condition of normally operated separators, and thus can reduce a difference from a pressure range required in the recompression process in which $CO_2$ recovered through the separator is compressed before the recovered $CO_2$ is recycled into the supercritical extractor later, thereby remarkably reducing the consumption of energy required for recompression.

For this purpose, the gaseous phase including $CO_2$ discharged from the separator can be condensed in the condenser so that the gaseous phase has a temperature of 10° C. or higher and a pressure of 60 bar to 90 bar. The condensation temperature in the condenser can be specifically greater than or equal to 17° C., more specifically in a range of 17° C. to 25° C. Also, the condensation pressure in the condenser can be specifically in a range of 60 bar to 80 bar, more specifically in a range of 60 bar to 70 bar. During the condensation in the condenser, the gaseous phase including $CO_2$ can be condensed within the above temperature range and the consumption of energy required for condensation can be reduced by setting the condensation temperature in the condenser to the above range. In addition, because an absorption chiller is applicable to the condensation in the temperature range, the surrounding waste heat of the process can be used to further save energy.

In the method of manufacturing a silica aerogel blanket according to one embodiment of the present invention, a separator having a first separation device and a second separation device connected in a multi-stage manner can be used as the separator. Therefore, a process of separating a gaseous phase including $CO_2$ and a liquid phase including a solvent to discharge the gaseous phase and liquid phase in Step (2) can be performed by multi-stage separation using the first and second separation devices connected in a multi-stage manner.

The first separation device and the second separation device can be operated under the same temperature and pressure conditions, and can also be operated under different temperature and pressure conditions. When the first separation device and the second separation device are operated under the same temperature and pressure conditions, the temperature and pressure conditions of the first separation device and the second separation device can be identical to the temperature and pressure conditions described above for the separator.

When the first separation device and the second separation device are operated under the different temperature and pressure conditions, the first separation device can have a pressure of 50 bar to 100 bar, specifically a pressure of 60 bar to 80 bar, and more specifically a pressure of 60 bar to 70 bar. Also, the separation in the first separation device can be performed under the condition of a temperature of 20° C. to 60° C., specifically a temperature of 30° C. to 50° C., and more specifically a temperature of 35° C. to 45° C. Also, the second separation device can have a pressure of 5 bar to 30 bar, specifically a pressure of 8 bar to 25 bar, and more specifically a pressure of 8 bar to 20 bar. Also, the separation in the second separation device can be performed under the condition of a temperature of 10° C. to 60° C., specifically a temperature of 20° C. to 50° C., and more specifically a temperature of 25° C. to 40° C.

Also, the method of manufacturing a silica aerogel blanket according to one embodiment of the present invention can further include: introducing the liquid phase including a solvent separated and discharged from the separator into a secondary separator and further separating the liquid phase into a gaseous phase including $CO_2$ and a liquid phase including a solvent to discharge the gaseous phase and the liquid phase.

The separation in the secondary separator can be performed under the condition of a pressure of 0 bar to 65 bar, specifically a pressure of 5 bar to 50 bar, and more specifically a pressure of 10 bar to 20 bar. Also, the separation in the secondary separator can be performed under the condition of a temperature of 0° C. to 40° C., specifically a temperature of 10° C. to 30° C., and more specifically a temperature of 20° C. to 30° C. In the secondary separator, gas/liquid separation can occur under the condition of a pressure lower than that of the primary separation in the separator. In this way, $CO_2$ dissolved in the liquid phase including a solvent, which has not been separated during the primary separation in the separator, can be further recovered.

Meanwhile, the method of manufacturing a silica aerogel blanket according to one embodiment of the present invention can further include: regulating a pressure of the extract so that the extract has a pressure of 50 bar to 100 bar, before introducing the extract discharged from the supercritical extractor into the separator.

The pressure of the extract can be regulated through a pressure control valve connected to the supercritical extractor and configured to regulate a pressure of the extract discharged from the supercritical extractor.

When the pressure of the extract discharged from the supercritical extractor is reduced, a decrease in temperature of the extract can be caused, which makes it possible to reach the temperature condition of the separator. Also, when the pressure of the extract is further reduced, the residue derived from a catalyst included in the extract and the residue derived from a surface modifying agent can react with carbon dioxide to form a carbonate, which can be precipitated. For example, when ammonium ions are included in the extract, the ammonium ions can form ammonium carbonate, ammonium bicarbonate, or a mixture thereof in a solid phase, which can be precipitated. Also, when sodium ions derived from a sodium hydroxide catalyst are included in the extract, the sodium ions can form sodium carbonate, sodium bicarbonate, or a mixture thereof in a solid phase, which can be precipitated. The precipitated carbonate in a solid-phase, such as ammonium carbonate, ammonium bicarbonate, sodium carbonate, sodium bicarbonate, or a mixture thereof, can be removed through a filtration device.

Therefore, the extract discharged from the supercritical extractor can be filtered through a filtration device. For this purpose, a front end of the pressure control valve can be connected to the supercritical extractor, and a rear end of the pressure control valve can be connected to a filtration device configured to filter the extract discharged from the supercritical extractor.

In the related art, a supercritical waste liquid can be regenerated using a method of neutralizing a waste liquid by adding distilled water, an ion exchange resin, or an acid, and then used. However, the method using the distilled water or the ion exchange resin has drawbacks in that it has poor economic feasibility and processability because it requires the investment of additional facilities and facility operating costs, a method using a neutralization reaction has poor safety due to a violent neutralization reaction and heat of neutralization, and pipes, mechanical devices, and the like can corrode due to the use of the acid.

In contrast, when the pressure of the extract discharged from the supercritical extractor during the supercritical drying process as described above is reduced under the control of the pressure control valve connected to the supercritical extractor to induce formation of ammonium carbonate, ammonium bicarbonate, or a mixture thereof, and the extraction is then filtered through the filtration device, a content of ammonium ions contained in the recovered extract can be reduced by a simple, stable and economic method.

The front end of the pressure control valve can be connected to the supercritical extractor, and the rear end of the pressure control valve can be connected to the filtration device. In this case, the extract discharged from the supercritical extractor can pass through the pressure control valve and can be filtered through the filtration device. The filtration device is not limited as long as it is a device capable of filtering the precipitated ammonium carbonate, ammonium bicarbonate, or a mixture thereof in a solid phase. For example, the filtration device can be a filter. The specification of the filter is not particularly limited. The upper limit of the mesh size of the filter is not particularly limited as long as a small precipitate is filtered as much as possible, but the filter can, for example, satisfy the specification of 10 mesh to 100,000 mesh, specifically 50 mesh to 10,000 mesh, 100 mesh to 5,000 mesh, and 100 mesh to 2,000 mesh, and more specifically 100 mesh to 1,000 mesh, and 100 mesh to 400 mesh.

The gaseous phase including $CO_2$ can be recovered as $CO_2$ in the condenser, and the recovered $CO_2$ can be further recompressed to a pressure of 100 bar to 190 bar using a pump, and then reused in supercritical extractor.

The pressure of the recompressed $CO_2$ can be a pressure of $CO_2$ injected into the above-described supercritical extractor, and can be, for example, in a range of 100 bar to 190 bar, specifically in a range of 120 bar to 180 bar, and more specifically in a range of 150 bar to 170 bar.

According to one embodiment of the present invention, the $CO_2$ recompressed by the pump can also be further heated to a temperature range of the supercritical drying process using a heater. The heating temperature can be in a range of 40° C. to 90° C., specifically in a range of 50° C. to 90° C., and more specifically in a range of 70° C. to 90° C.

Also, the present invention provides an apparatus for manufacturing a silica aerogel blanket, which can be applied to the method of manufacturing a silica aerogel blanket.

The apparatus for manufacturing a silica aerogel blanket includes a supercritical extractor into which a silica hydrogel is introduced and $CO_2$ is injected; a separator connected to the supercritical extractor through a pipe and configured to separate the extract discharged from the supercritical extractor into a gaseous phase including $CO_2$ and a liquid phase including a solvent to discharge the gaseous phase and the liquid phase; and a condenser connected to the separator through a pipe and configured to condense the gaseous phase including $CO_2$ discharged from the separator, wherein the separator is operated under the condition of a pressure of 50 bar to 100 bar, and the condenser condenses the gaseous phase including $CO_2$ discharged from the separator so that the gaseous phase has a temperature of 10° C. or higher and a pressure of 50 bar to 100 bar.

The separator can include a first separation device and a second separation device. In this case, the first separation device and the second separation device can be connected in a multi-stage manner, and the first separation device and the second separation device can be operated under the same temperature and pressure conditions, and can also be operated under different temperature and pressure conditions.

Also, the apparatus for manufacturing a silica aerogel blanket can further include a pressure control valve configured to regulate a pressure of the extract discharged from the supercritical extractor, wherein a front end of the pressure control valve can be connected to the supercritical extractor through a pipe, and a rear end of the pressure control valve can be connected to the separator through the pipe.

The pressure control valve can maintain an internal pressure of the supercritical extractor during the supercritical drying step, and then can regulate a pressure of the extract discharged from the supercritical extractor. Specifically, the pressure control valve can reduce a pressure of the extract discharged from the supercritical extractor to reduce the temperature of the extract.

Also, the apparatus for manufacturing a silica aerogel blanket can further include a filtration device connected to the rear end of the pressure control valve.

The front end of the pressure control valve can be connected to the supercritical extractor, and the rear end of the pressure control valve can be connected to the filtration device. In this case, the pressure control valve can regulate the pressure of the extract by regulating a flow rate of the extract. The extract discharged from the supercritical extractor can pass through the pressure control valve and can be filtered through the filtration device. For example, because the pressure of the extract is reduced while the extract passes through the pressure control valve, the temperature of the extract can be reduced due to the volume expansion. As described above, when the temperature is reduced, an ammonium salt included in the extract can be precipitated as ammonium carbonate, ammonium bicarbonate, or a mixture thereof, and can be removed by filtration through the filtration device.

According to one embodiment of the present invention, in the apparatus for manufacturing a silica aerogel blanket, the extract filtered through the filtration device can be delivered to the separator to achieve gas/liquid separation.

According to one embodiment of the present invention, the apparatus for manufacturing a silica aerogel blanket can also further include a pre-filter between the supercritical extractor and the front end of the pressure control valve. The pre-filter can primarily filter carbonates, such as ammonium carbonate, ammonium bicarbonate, sodium carbonate, sodium bicarbonate, or a mixture thereof, which can be formed by adding $CO_2$ in the supercritical drying process, silica fine particles separated during aerogel formation and/or from the blanket, other fine particles, or the like to more effectively remove ammonium salts. Also, a phenomenon in which ammonium carbonate, ammonium bicarbonate, or a mixture thereof is precipitated in the pressure control valve can be prevented.

The pre-filter is not limited as long as it is a device capable of primarily filtering the ammonium carbonate, ammonium bicarbonate, or a mixture thereof. For example, the pre-filter can be a filter. When the pre-filter is a filter, the specification of the pre-filter is not particularly limited. The upper limit of the mesh size of the pre-filter is not particularly limited as long as a small precipitate is filtered as much as possible, but the pre-filter can, for example, satisfy the specification of 10 mesh to 100,000 mesh, specifically 50 mesh to 10,000 mesh, 100 mesh to 5,000 mesh, 100 mesh to 2,000 mesh, and more specifically 100 mesh to 1000 mesh, and 100 mesh to 400 mesh.

Furthermore, the apparatus for manufacturing a silica aerogel blanket according to one embodiment of the present invention further includes a secondary separator connected between the separator and the condenser through a pipe and configured to allow the solvent separated and discharged from the separator to flow therein and further separate the solvent into a gaseous phase including $CO_2$ and a liquid phase including a solvent, wherein the secondary separator can deliver the gaseous phase including $CO_2$ secondarily separated through a pipe to the condenser. The secondary separator can be operated in a pressure range lower than that of the separator configured to separate the extract discharged from the extractor, thereby further separating the gaseous phase including $CO_2$ from the solvent separated and discharged from the separator.

Further, the apparatus for manufacturing a silica aerogel blanket according to one embodiment of the present invention can further include a pump configured to recompress the condensed $CO_2$, wherein the $CO_2$ recovered from the condenser can be allowed to flow in the pump, and the pump can deliver the recompressed $CO_2$ to the supercritical extractor. Also, the apparatus for manufacturing a silica aerogel blanket according to one embodiment of the present invention can further include a heater configured to heat the recompressed $CO_2$ before delivering the recompressed $CO_2$ from the pump to the supercritical extractor.

The pump can compress the $CO_2$ in a pressure range required by the supercritical extractor, and the heater can heat the $CO_2$ in a temperature range required by the supercritical extractor.

Hereinafter, the apparatus for manufacturing a silica aerogel blanket according to one embodiment of the present invention will be described with reference to the accompanying drawings. However, the drawings attached to this specification are illustrative of preferred examples of the present invention, and serve to enable technical concepts of the present invention to be further understood together with the detailed description of the invention given below, and therefore the present invention should not be interpreted as being limited only to the details described in such drawings.

FIG. 1 shows an apparatus for manufacturing a silica aerogel blanket according to one embodiment of the present invention. Referring to FIG. 1, the apparatus for manufacturing a silica aerogel blanket according to one embodiment of the present invention includes a supercritical extractor 100 into which a silica hydrogel is introduced and $CO_2$ is injected; a separator 200 connected to the supercritical extractor 100 through a pipe and configured to separate the extract discharged from the supercritical extractor 100 into a gaseous phase including $CO_2$ and a liquid phase including a solvent to discharge the gaseous phase and the liquid phase; and a condenser 300 connected to the separator 200 through a pipe and configured to condense the gaseous phase including $CO_2$ discharged from the separator. The separator 200 included in the apparatus for manufacturing a silica aerogel blanket according to one embodiment of the present invention can include two separation devices 201 and 202 connected in a multi-stage manner. In this case, the two separation devices 201 and 202 can be operated under the same temperature and pressure conditions. When the separator 200 includes two separation devices 201 and 202, the gaseous phase including $CO_2$ separated in the first separation device 201 can be transferred to the second separation device 202, and the gaseous phase including $CO_2$ separated in the second separation device 202 can be delivered to the condenser 300. Then, the gaseous phase including $CO_2$ can be condensed in the condenser 300 so that the gaseous phase including $CO_2$ has a temperature of 10° C. or higher and a pressure of 50 bar to 100 bar.

The pressure of the extract discharged from the supercritical extractor 100 can be regulated through a pressure control valve 400, and a front end of the pressure control valve 400 can be connected to the supercritical extractor 100, and a rear end of the pressure control valve 400 can be connected to the separator 200. In this case, a filtration device 410 can be connected to the rear end of the pressure control valve 400. In this case, the extract discharged from the supercritical extractor 100 passes through the pressure control valve 400 and is filtered through the filtration device 410, and the extract filtered through the filtration device 410 is delivered to the separator 200. When necessary, a pre-filter (not shown) can be further installed between the supercritical extractor 100 and the front end of the pressure control valve 400.

According to one embodiment of the present invention, the liquid phase separated in the first separation device 201 and the second separation device 202 and discharged through a lower end of each of the separation devices 201 and 202 can be recovered as it is, but can be further delivered to a secondary separator 500 and then subjected to an additional separation process.

The secondary separator 500 delivers the secondarily separated gaseous phase including $CO_2$ to the condenser 300. Then, the gaseous phase including $CO_2$ is condensed in the condenser 300 so that the gaseous phase including $CO_2$ has a temperature of 10° C. or higher and a pressure of 50 bar to 100 bar.

The gaseous phase including $CO_2$ is condensed and recovered as $CO_2$ in the condenser 300, and the recovered $CO_2$ can be further recompressed to a pressure of 100 bar to 190 bar using a pump 600, and then reused in the supercritical extractor 100. Also, the recompressed $CO_2$ can be re-heated through a heater 700 before being delivered to the super-critical extractor 100.

Figure 2:
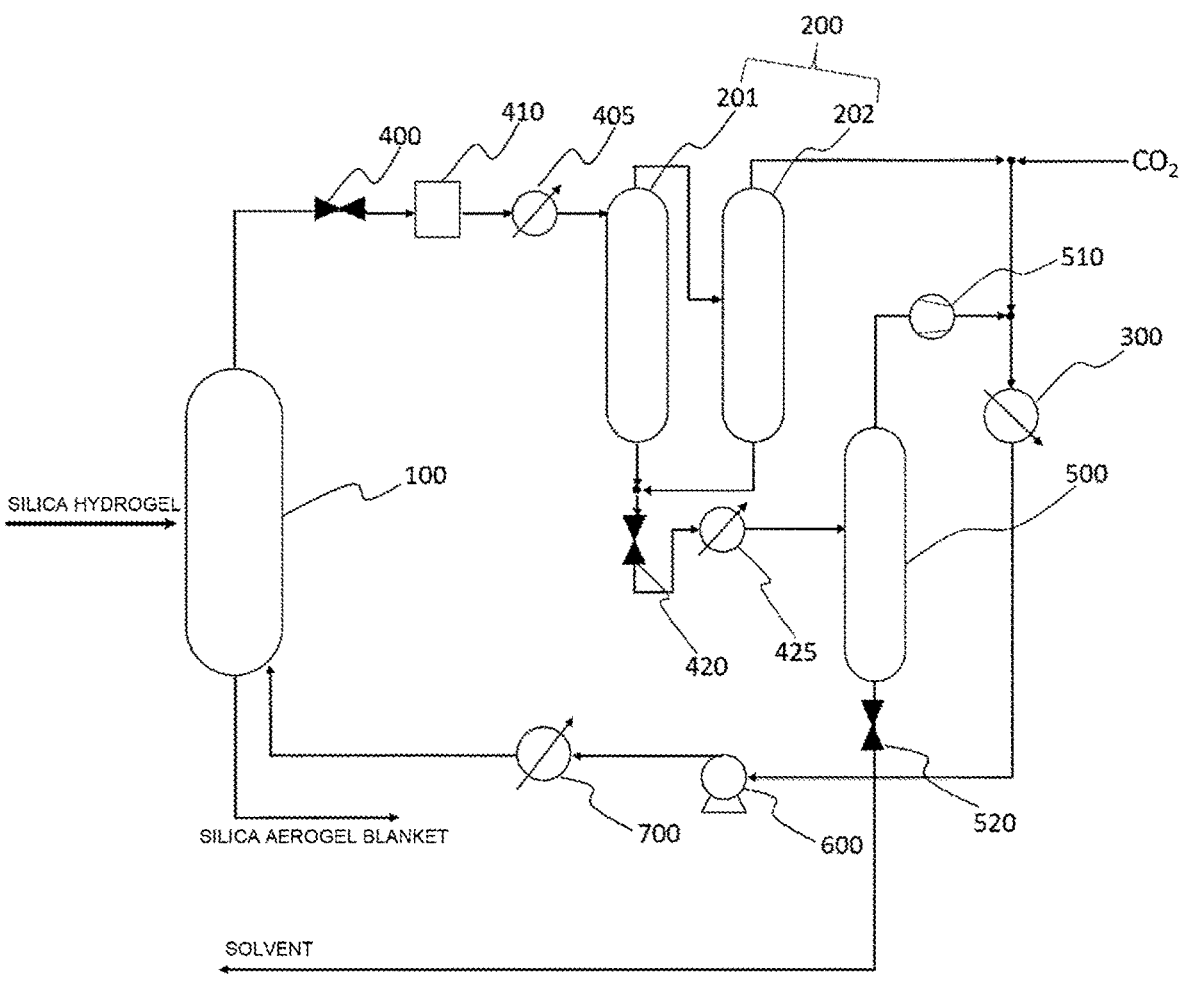
FIG. 2 schematically shows an apparatus for manufacturing a silica aerogel blanket according to another embodiment of the present invention.

FIG. 2 shows an apparatus for manufacturing a silica aerogel blanket according to another embodiment of the present invention. Referring to FIG. 2, in the apparatus for manufacturing a silica aerogel blanket, a heater 405 is connected to the rear end of the filtration device 410 connected to the rear end of the pressure control valve 400. The heater 405 is connected to the separator 200, and the extract discharged from the heater 405 is delivered to the separator 200. The separation temperature of the separator 200 configured to separate a gaseous phase including $CO_2$ and a liquid phase including a solvent can be regulated using the heater 405. Also, the pressure of the supercritical extractor 100 can be regulated using the pressure control valve 400, and the separation pressure in the separator 200 can also be regulated.

Also, a lower end of each of the first separation device 201 and the second separation device 202 of the separator 200 is connected to a pressure control valve 420, and a rear end of the pressure control valve 420 is connected to the secondary separator 500. The liquid phase including a solvent is delivered to the secondary separator 500 through the pressure control valve 420 connected to each of the first separation device 201 and the second separation device 202, and the pressure of each of the first separation device 201 and the second separation device 202 can be regulated using the pressure control valve 420.

A heater 425 is installed between the pressure control valve 420 and the secondary separator 500, and the liquid phase including a solvent which has passed through the pressure control valve 420 is heated by the heater 425 and delivered to the secondary separator 500. As a result, the temperature of the secondary separator can be regulated using the heater 425.

A compressor 510 is connected to an upper end of the secondary separator 500, and a pressure control valve 520 is connected to a lower end of the secondary separator 500. In this case, the pressure of the secondary separator 500 is regulated using the compressor 510 and the pressure control valve 520.

Figure 3:
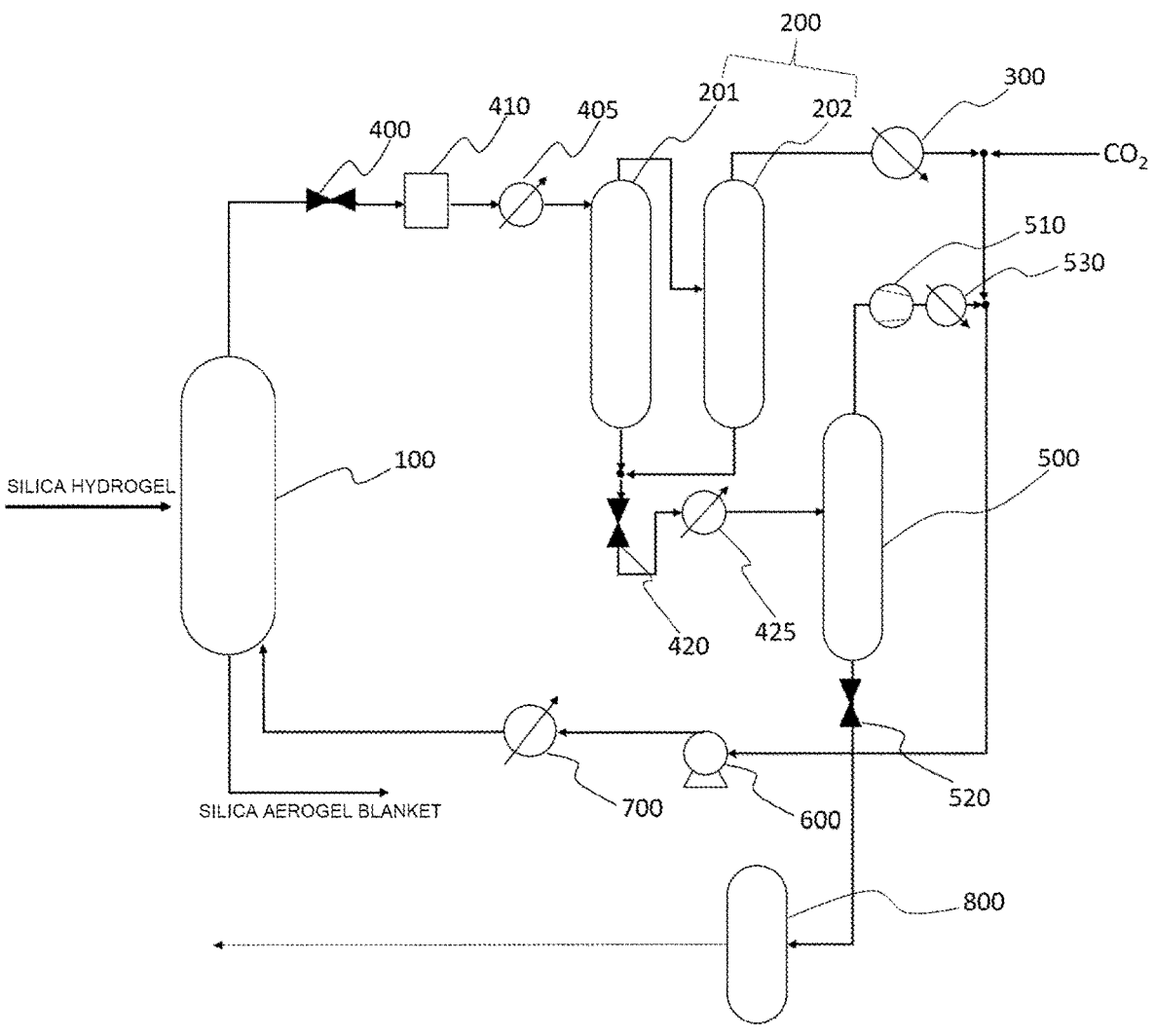
FIG. 3 schematically shows an apparatus for manufacturing a silica aerogel blanket according to still another embodiment of the present invention.

FIG. 3 shows an apparatus for manufacturing a silica aerogel blanket according to still another embodiment of the present invention. Referring to FIG. 3, because an additional condenser 530 is installed at the rear end of the compressor 510, the gaseous phase discharged from the secondary separator 500 is condensed. The condenser 300 can be disposed so that the condenser 300 condenses only the gaseous phase discharged from the primary separator 200. In this case, the gaseous phase which has passed through the primary separator 200 and the gaseous phase which has passed through the secondary separator 500 can be condensed through separate condensers, respectively.

Also, a solvent recovery tank 800 configured to recover the liquid phase discharged from the secondary separator 500 is connected to a rear end of the pressure control valve 520, and the recovered solvent is stored in the solvent recovery tank 800.

EXAMPLES

Hereinafter, exemplary embodiments of the present invention will be described in detail so that a person having ordinary skill in the art to which the present invention belongs can easily put the invention into practice. However, it should be understood that the present invention can be embodied in various forms and is not intended to limit the exemplary embodiments described herein.

In the following Examples and Comparative Examples, a method of manufacturing a silica aerogel according to the present invention was simulated using a commercially available process simulation program ASPEN PLUS. Values stored in the program, values disclosed in the documents, and the like were used as the constants required for the simulation.

Example 1

8.2 kg of hydrated tetraethyl orthosilicate (TEOS) as a silica precursor, and 2.0 kg of trimethyl ethoxysilane (TMES) were mixed with 8.7 kg of ethanol to prepare 19 kg of a silica sol (target density (TD): 40 kg/m$^3$). Separately, 13.1 kg of ethanol and 1.7 kg of $NH_4OH$ (a 30% aqueous solution) were mixed to prepare a gelling catalyst solution. A glass fiber mat was immersed and gelled in the solution. The gelation was performed for 10 minutes. After the gelation was completed, the glass fiber mat was stabilized at room temperature (25° C.) for 10 minutes, and then dry-aged and surface-modified at room temperature.

When the surface modification was completed, the manufactured silica gel-fiber composite was added to a 70 L of supercritical extractor, and $CO_2$ was continuously injected at 80° C., 170 bar, and a rate of 6.1 kg/min. Thereafter, the resulting mixture was extracted for 20 minutes, and $CO_2$ was again continuously injected at 80° C., 160 bar, and a rate of 6.5 L/min for 20 minutes. The discharged extract was delivered through a pressure control valve connected to the supercritical extractor, and the pressure of the extract was reduced to 65 bar using the pressure control valve. Then, the extract was subjected to gas/liquid separation at 65 bar and 40° C. in a primary separator, followed by gas/liquid separation at 20 bar and 25° in a secondary separator. Gas-phase $CO_2$ and liquid-phase ethanol were recovered in the separators. The recovered gas-phase $CO_2$ was condensed at 17° C. or lower (65 bar) in the condenser, and then recompressed to 170 bar. Then, the gas-phase $CO_2$ was re-heated to approximately 80° C. using the heater, and recycled. The liquid-phase ethanol separated through a lower portion of the separator was subjected to an additional catalyst (ammonia) removal process for reuse, and then reused for sol and catalyst preparation, a gelation reaction, and the like to manufacture a silica aerogel blanket.

Example 2

This example was performed in the same manner as in Example 1, except that the extract was subjected to gas/liquid separation at 10 bar and 25° C. in the secondary separator, and the additionally recovered $CO_2$ was recompressed to 65 bar and then condensed at 17° C. or lower.

Example 3

8.3 kg of hydrated tetraethyl orthosilicate (TEOS) as a silica precursor was mixed with 19 kg of ethanol to prepare 40 L of a silica sol (target density (TD): 40 kg/m$^3$). Separately, 3.4 kg of ethanol and 0.18 kg of $NH_4OH$ (a 30% aqueous solution) were mixed to prepare a gelling catalyst solution. A glass fiber mat was immersed and gelled in the solution. The gelation was performed for 10 minutes. After the gelation was completed, the glass fiber mat was stabilized at room temperature (25° C.) for 10 minutes. Then, a mixture (a volume ratio of 98:2) of ethanol and NH$_4$OH was prepared, and added in an amount 1.6 times the volume of the silica sol, aged at 70° C. for an hour, and then surface-modified with hexamethyldisilazane for 5 hours.

After the surface modification was completed, the manufactured silica gel-fiber composite was added to a 70 L of supercritical extractor, and CO$_2$ was continuously injected at 80° C., 170 bar, and a rate of 6.1 kg/min. Thereafter, the resulting mixture was extracted for 20 minutes, and CO$_2$ was again continuously injected at 80° C., 160 bar, and a rate of 6.5 L/min for 20 minutes. The discharged extract was delivered through a pressure control valve connected to the supercritical extractor, and the pressure of the extract was reduced to 65 bar using the pressure control valve. Then, the extract was subjected to gas/liquid separation at 65 bar and 40° C. in a primary separator, followed by gas/liquid separation at 10 bar and 25° in a secondary separator. Gas-phase CO$_2$ and liquid-phase ethanol were recovered in the separators. The recovered gas-phase CO$_2$ was condensed at 17° C. or lower (65 bar) in the condenser, and then recompressed to 170 bar. Then, the gas-phase CO$_2$ was re-heated to approximately 80° C. using the heater, and recycled. The liquid-phase ethanol separated through a lower portion of the separator was subjected to an additional catalyst (ammonia) removal process for reuse, and then reused for sol and catalyst preparation, a gelation reaction, and the like to manufacture a silica aerogel blanket.

Comparative Example 1

A silica gel-fiber composite was manufactured in the same manner as in Example 1. The pressure of the discharged extract was reduced to 50 bar using the pressure control valve, and the extract was subjected to gas/liquid separation at 50 bar and 40° C. in a separator. Thereafter, the CO$_2$ recovered through an upper portion of the separator was condensed at 0° C. in a condenser, and then recompressed to 170 bar. Subsequent processes were performed in the same manner as in Example 1, except that the CO$_2$ was re-heated to 80° C. through a heater and recycled.

Experimental Example

1) Energy Consumption

Heat duties for heating, cooling and condensation in Examples 1 to 3 and Comparative Example 1 were calculated using Aspen Plus. The results are listed in Table 1 below.

2) Evaluation of Thermal Conductivity

Thermal conductivities of the silica aerogel blankets manufactured using the recovered ethanol in Examples 1 to 3 and Comparative Example 1 were measured. The results are listed in Table 2 below.

The thermal conductivities were measured at 25° C. using a thermal conductivity measuring instrument (NETZSCH, HFM436 Lambda).

TABLE 1

| | Heating (Gcal/b) | Cooling (Gcal/b) | Condensation/ pumping (Gcal/b) | Total energy consumption (Gcal/b) | Energy consumption vs. Comparative Example 1 (%) |
|---|---|---|---|---|---|
| Example 1 | 0.031 | 0.029 | 0.006 | 0.066 | 70 |
| Example 2 | 0.038 | 0.033 | 0.010 | 0.081 | 86 |

TABLE 1-continued

| | Heating (Gcal/b) | Cooling (Gcal/b) | Condensation/ pumping (Gcal/b) | Total energy consumption (Gcal/b) | Energy consumption vs. Comparative Example 1 (%) |
|---|---|---|---|---|---|
| Example 3 | 0.038 | 0.033 | 0.010 | 0.081 | 86 |
| Comparative Example 1 | 0.052 | 0.036 | 0.005 | 0.094 | 100 |

As shown in Table 1, in the case of Examples 1 to 3, it can be seen that the CO$_2$ and solvent used in the supercritical drying step were efficiently recovered with only 70 to 86% energy consumption, compared to Comparative Example 1.

TABLE 2

| | Example 1 | Example 2 | Example 3 | Comparative Example 1 |
|---|---|---|---|---|
| Thermal conductivity (mW/mK) | 17.55 | 17.29 | 17.60 | 17.94 |

As shown in Table 2, it can be seen that the silica aerogel blankets of Examples 1 to 3 had lower thermal conductivity, compared to that of Comparative Example 1. Based on the finding, it can be seen that the silica aerogel blankets manufactured using the liquid-phase ethanol recovered in Examples 1 to 3 had equivalent or superior physical properties, compared to the silica aerogel blanket manufactured using the liquid-phase ethanol recovered using a conventional solvent recovery method as in Comparative Example 1. Based on the results, it can be seen that, the CO$_2$ used in the supercritical drying step were efficiently recovered even with less energy consumption using the method of manufacturing a silica aerogel blanket according to the present invention.

BRIEF DESCRIPTION OF ITEM LABELS IN THE DRAWINGS

100: supercritical extractor
200: separator
201: first separation device
202: second separation device
300, 530: condenser
400, 420, 520: pressure control valve
405, 425, 700: heater
410: filtration device
500: secondary separator
510: compressor
600: pump
800: solvent recovery tank

The invention claimed is:

1. A method of manufacturing a silica aerogel blanket, comprising:

(1) drying a silica hydrogel through a supercritical drying process using a supercritical extractor;

(2) separating an extract discharged from the supercritical extractor into a gaseous phase comprising CO$_2$ and a liquid phase comprising a solvent through a primary separator under the conditions of a pressure of 60 bar to 90 bar and a temperature of 35° C. to 60° C. to discharge the gaseous phase and then introducing the liquid phase discharged from the primary separator into a secondary separator under the conditions of a pressure of 5 bar to 30 bar and a temperature of 25° C. to 40° C. to further separate the liquid phase into a gaseous phase comprising $CO_2$ and a liquid phase comprising a solvent to discharge the gaseous phase and the liquid phase; and (3) condensing the gaseous phase comprising $CO_2$ discharged from the primary separator and the secondary in a condenser, wherein the gaseous phase in the condenser has a temperature of 17° C. or higher and a pressure of 60 bar to 90 bar.

2. The method of claim 1, further comprising, before introducing the extract discharged from the supercritical extractor into the primary separator:

regulating a pressure of the extract so that the extract has a pressure of 50 bar to 100 bar.

3. The method of claim 2, wherein the pressure of the extract is regulated through a pressure control valve connected to the supercritical extractor and configured to regulate the pressure of the extract discharged from the supercritical extractor.

4. The method of claim 3, wherein a front end of the pressure control valve is connected to the supercritical extractor, and a rear end of the pressure control valve is connected to a filtration device configured to filter the extract discharged from the supercritical extractor.

5. The method of claim 1, wherein the $CO_2$ in the gaseous phase comprising $CO_2$ is recovered through the condenser, and the recovered $CO_2$ is further recompressed to a pressure of 100 to 190 bar using a pump and reused in the supercritical extractor.

\*    \*    \*    \*    \*